Dec. 12, 1950  R. COLLEY  2,533,999
HARROW TRUCK
Filed March 28, 1946
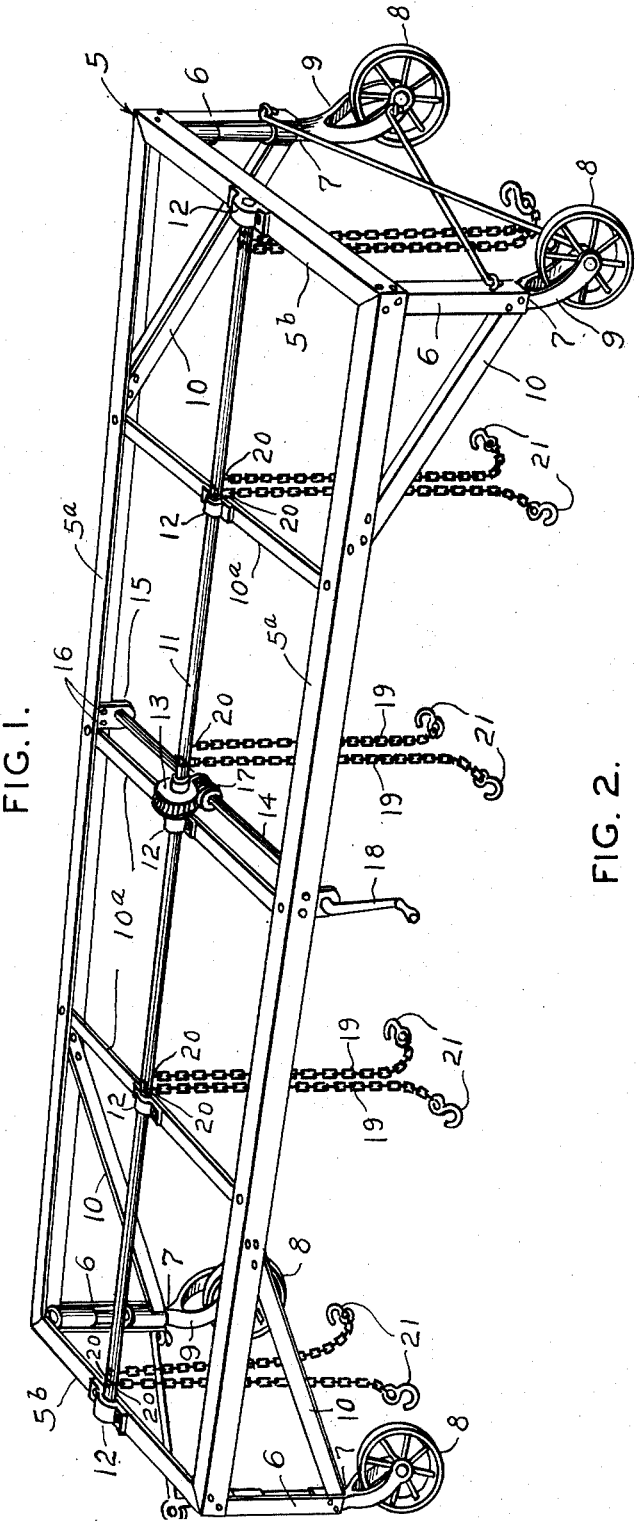
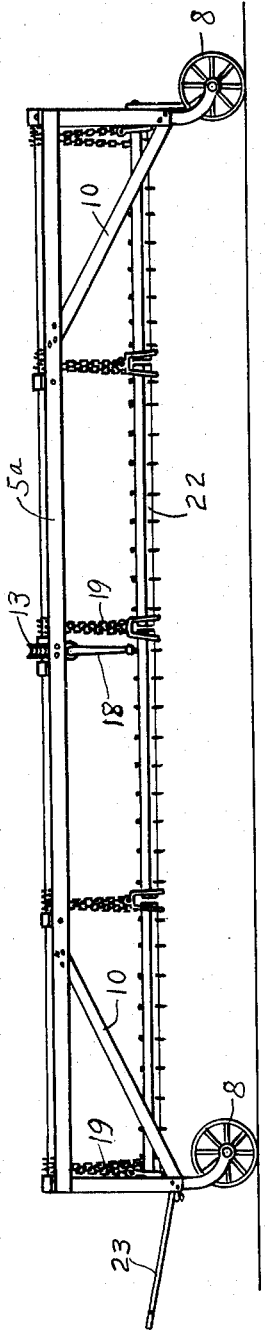
FIG. 1.
FIG. 2.
INVENTOR;
RALPH COLLEY
BY *U. E. Fisher*
ATTORNEY Patented Dec. 12, 1950

2,533,999

UNITED STATES PATENT OFFICE 2,533,999

HARROW TRUCK

Ralph Colley, Tonica, Ill.

Application March 28, 1946, Serial No. 657,855

1 Claim. (Cl. 55—73)

This invention is in the nature of a harrow truck, or a wheeled truck formed, arranged and adapted for moving astraddle a conventional ground harrow, and provided with means for raising the harrow from the ground for moving same to another location.

The principal object of the invention is to provide a suitable open and elongated, rectangular frame, somewhat larger in length and width than the harrow to be moved, provided at its four corners with rigidly pendant legs having caster wheels at their lower ends, the said wheeled frame having a tongue supported from one end thereof for connecting a team of horses or motor vehicle, and having means for raising the harrow over which it is moved, vertically from the ground for the purpose of transportation.

With the stated objects in view, together with such other objects and advantages as may appear from the following specification, attention is directed to the accompanying drawing, wherein Figure 1 is a perspective view of a harrow truck as constructed in accordance with this invention.

Figure 2 is a side elevational view of the truck, showing a harrow suspended thereunder, ready for transportation.

The invention comprises an elongated rectangular frame 5 including the long side bars 5a and connected short end bars 5b formed of angle iron or other suitable material, and provided with the rigidly joined and pendant legs 6, at the lower ends of which are swivelled in conventional manner as at 7, the caster wheels 8 seated within the swivel forks 9, in a well known manner.

The frame 5 is reinforced by means of the diagonal braces 10 and cross braces 10a.

An elevator shaft 11 is journaled longitudinally and medially atop the frame, through the bearing loops 12 anchored medially atop the bars 5b, 10a, and an elevator spur gear 13 is rigidly joined to the rod 11 at a medial point thereof and preferably adjacent one of the cross-bars 10a for the sake of stability against strain.

A secondary elevator shaft 14 is journaled through hangers 15 anchored at 16 to the side bars 5a of the frame, and of course perpendicularly to the shaft 11. The shaft 14 is located directly under the gear 13, and a worm gear 17 is rigidly mounted on the shaft 14 and is placed in mesh with the spur gear 13.

An operating crank 18 is rigidly extended at a right angle from one end of the cross shaft 14, which shaft at this side is passed clear through the hanger 15 and is simply bent aside at an angle of ninety degrees to form the integral crank. Pairs of elevator chains 19 are anchored at 20 to the shaft 11, at points immediately adjacent the cross bars 10a, and these chains are provided at their free ends with hooks 21 adapted for engaging aligned rails 22 of the harrow, at either side thereof, for elevating and moving same. A tongue 23 is extended at one end of the truck, for attaching a team or other power for moving the truck and suspended harrow.

In use the truck is simply moved astraddle the harrow, hooks 21 connected therewith, and shaft 14 rotated for elevating the harrow from the ground. The truck is then moved endwise to the new location.

While I have here shown and described a particular embodiment of the invention and special structural features thereof, it is understood that minor changes may be made, within the scope of the claim.

I claim:

In a harrow truck wherein is embodied an oblong rectangular frame for horizontally positioning over a harrow, and including legs rigidly depending from the corners of the frame and caster wheels mounted in the lower ends of the legs, said frame including side and end members and a plurality of cross braces extending transversely in spaced relation between the side members of the frame, one of said cross braces being midway the ends of the frame, a primary elevator shaft journaled longitudinally and centrally over the upper side of the frame and cross braces thereof and through bearing loops secured to the upper sides of the said cross braces and end members of the frame, a spur gear keyed upon the primary elevator shaft alongside the midway cross brace of the frame, a secondary elevator shaft journaled transversely through the frame immediately below the spur gear of the primary shaft, a worm gear keyed upon the secondary shaft and in mesh with the spur gear of the primary shaft, means for rotating the secondary elevator shaft, pairs of lifting chains anchored at their upper ends to the primary elevator shaft and immediately adjacent the said cross braces and end members of the frame, and hooks at the lower ends of said lifting chains for engaging a harrow located underneath the said frame, whereby rotation of the secondary elevator shaft will rotate the primary elevator shaft and wind the lifting chains upon the primary elevator shaft and lift the harrow from the ground for transporting same from place to place.

RALPH COLLEY.

REFERENCES CITED

The following references are of record in the file of this patent:

UNITED STATES PATENTS

| Number | Name | Date |
|---|---|---|
| 594,900 | Palmer | Dec. 7, 1897 |
| 891,364 | Oberly | June 23, 1908 |
| 1,864,124 | Dickens | June 21, 1932 |